US006321270B1

(12) United States Patent
Crawley

(10) Patent No.: US 6,321,270 B1
(45) Date of Patent: *Nov. 20, 2001

(54) METHOD AND APPARATUS FOR MULTICAST ROUTING IN A NETWORK

(75) Inventor: Eric S. Crawley, Maynard, MA (US)

(73) Assignee: Nortel Networks Limited, St. Laurent (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/722,480

(22) Filed: Sep. 27, 1996

(51) Int. Cl.$^7$ .................................................. G06F 15/173
(52) U.S. Cl. ........................................... 709/238; 370/390
(58) Field of Search .................... 395/200.43, 200.53, 395/200.62, 200.68, 200.74; 370/390, 400, 255; 709/213, 223, 232, 238, 244

(56) References Cited

U.S. PATENT DOCUMENTS

| | | | |
|---|---|---|---|
| 5,157,663 | * 10/1992 | Major et al. ........................... | 371/9.1 |
| 5,195,086 | * 3/1993 | Baugartner et al. .................... | 370/62 |
| 5,355,371 | * 10/1994 | Auerbach et al. ...................... | 370/60 |
| 5,361,256 | * 11/1994 | Doeringer et al. ..................... | 370/60 |
| 5,517,494 | * 5/1996 | Green ..................................... | 370/60 |
| 5,606,669 | * 2/1997 | Bertin et al. ..................... | 395/200.15 |
| 5,732,086 | * 3/1998 | Liang et al. ........................... | 370/410 |

OTHER PUBLICATIONS

Ballardie, A.J., Reeve, S., Jain, N. "Core Based Tress (CBT) Multicast—Protocol Specification—>draft–ietf–idmr–cbt–spec–05.txt≦," Inter–Domain Multicast Routing , Internet–Draft, 32 pages.

Deering, S., et al., "Protocol Independent Multicast–Sparse Mode (PIM–SM): Protocol Specification," draft–ietf–idmr–PIM–SM–spec–02.ps. Internet–Draft, 41 pages.

Multicast Extensions to OSPF (MOSPF), J. Moy, Network Working Group Request for Comments: 1584, Mar. 1994.

Distance Vector Multicast Routing Protcol (DVMRP), T. Pusateri, Internet Engineering Task Force (IETF), draft–ietf–idmr–dvmrp–v3–02, Jul. 1996.

\* cited by examiner

Primary Examiner—Glenton B. Burgess
Assistant Examiner—Kenneth W. Fields
(74) Attorney, Agent, or Firm—Blakely Sokoloff Taylor & Zafman, LLP

(57) ABSTRACT

A system is provided for controlling a multicast session in a network having multiple network nodes. The system selects one of the network nodes as a control point associated with the multicast session. Identity of the control point is then advertised to all network nodes in a particular area. The control point determines multicast control information for the multicast session. Multicast control information determined by the control point is transmitted to the network nodes participating in the multicast session. The multicast control information may include network nodes participating in the multicast session, multicast reflection points, or instructions for transmitting multicast data to members of the multicast session. Updating of the multicast control information occurs in response to network changes. The system may provide a secondary control point that maintains a copy of control information associated with the multicast session.

33 Claims, 8 Drawing Sheets

METHOD AND APPARATUS FOR MULTICAST ROUTING IN A NETWORK

BACKGROUND OF THE INVENTION

1. Field of the Invention

The present invention relates to networks and, more specifically, to a system for routing data through a network.

2. Background

The flow of data through a network is accomplished by transmitting data from one network node to another until the destination node is reached. Various protocols are available for transmitting data through a network. The protocol selected may be based on the type of network, the network topology, the type of data flowing through the network, and other factors. Two different classes of routing protocols are available for transmitting data through a network: unicast routing protocols and multicast routing protocols. Unicast routing protocols transmit data from a single source node to a single destination node. Multicast routing protocols transmit data from one or more source nodes to multiple destination nodes. Typically, the multiple destination nodes are members of a multicast group such that each member of the group receives data addressed to the group. Multicast routing protocols allow the sending nodes to transmit data to a single multicast address identifying the multicast group rather than generating separate packets or data flows for each destination node in the group.

Multicast routing protocols utilize multicast distribution trees to identify multicast group members and paths from the source node to each group member. A separate multicast distribution tree is typically provided for each sending node in a multicast group. Multicast distribution trees are updated in response to changes in network topology and changes in multicast group membership. For example, an existing multicast distribution tree may be expanded when new multicast group members are added. An existing multicast distribution tree may be reduced, or pruned, if existing group members are removed from a multicast group.

Various mechanisms are available for controlling the maintenance of multicast distribution trees and controlling the flow of multicast data through a network. Known multicast routing protocols use a "core" or "rendezvous point" for both controlling the maintenance of multicast distribution trees and controlling the flow of data in a multicast session. The core or rendezvous point is a particular node in the network responsible for maintaining and updating the multicast distribution tree. Additionally, the core or rendezvous point is responsible for handling the flow of data to all multicast group members. By combining the control and data flow operations in a single node, a failure in that control node will cause disruption of both the control functions and the data flow associated with the multicast session.

Other known multicast routing protocols distribute multicast group membership information to all nodes in the network or network area, thereby avoiding the use of a single node responsible for both control and data flow. By distributing multicast group membership information to all nodes, each node in the network is capable of calculating the multicast distribution tree as needed. This distribution of group membership information requires that each node store information related to all multicast sessions, regardless of whether the node is actually participating in the particular multicast session. By requiring distribution of group membership information to every node, this system increases the overall traffic flowing through the network. Additionally, the distribution of group membership information to every node increases the amount of information which must be stored by each node in the network. Thus, network nodes may require additional storage facilities to maintain the various multicast information. As mentioned above, each node receives and stores multicast group information regardless of whether the node is actually participating in the particular multicast session. Therefore, much of the information transmitted to and stored by a particular node may not be used by the node, thereby resulting in the transmission and storage of unnecessary information.

It is therefore desirable to provide a system that does not needlessly transmit multicast group information to all nodes in a network. Furthermore, a robust system would eliminate the single point of failure caused by combining multicast control and data flow operations into a single network node.

SUMMARY OF THE INVENTION

The present invention selects a particular network node as a control point associated with one or more multicast sessions. The control point is responsible for distributing multicast control information to all multicast group members in the network or network area. Multicast session data is not required to flow through the control point. Instead, the control point transmits control information to other network nodes providing instructions for handling multicast session data. Thus, failure of the control point does not cause the entire multicast session to fail. Additionally, the control point transmits control information only to those nodes participating in a particular multicast session. Therefore, the invention does not transmit multicast control information to nodes that are not participating in the multicast session.

An embodiment of the invention provides a system for controlling a multicast session in a network by selecting one of the network nodes as a control point associated with the multicast session. The selected control point determines multicast control information for the multicast session. The control information is then transmitted by the control point to the network nodes participating in the multicast session.

Another aspect of the invention selects one of the network nodes as a secondary control point associated with the multicast session. The secondary control point maintains a copy of control information determined by the control point.

Other embodiments of the invention provide for the establishment of a new control point if the existing control point fails.

Another feature of the invention updates the multicast control information in response to network changes. The updated multicast control information is then transmitted to network nodes participating in the multicast session.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, and circuits have not been described in detail so as not to obscure the invention.

Figure 1:
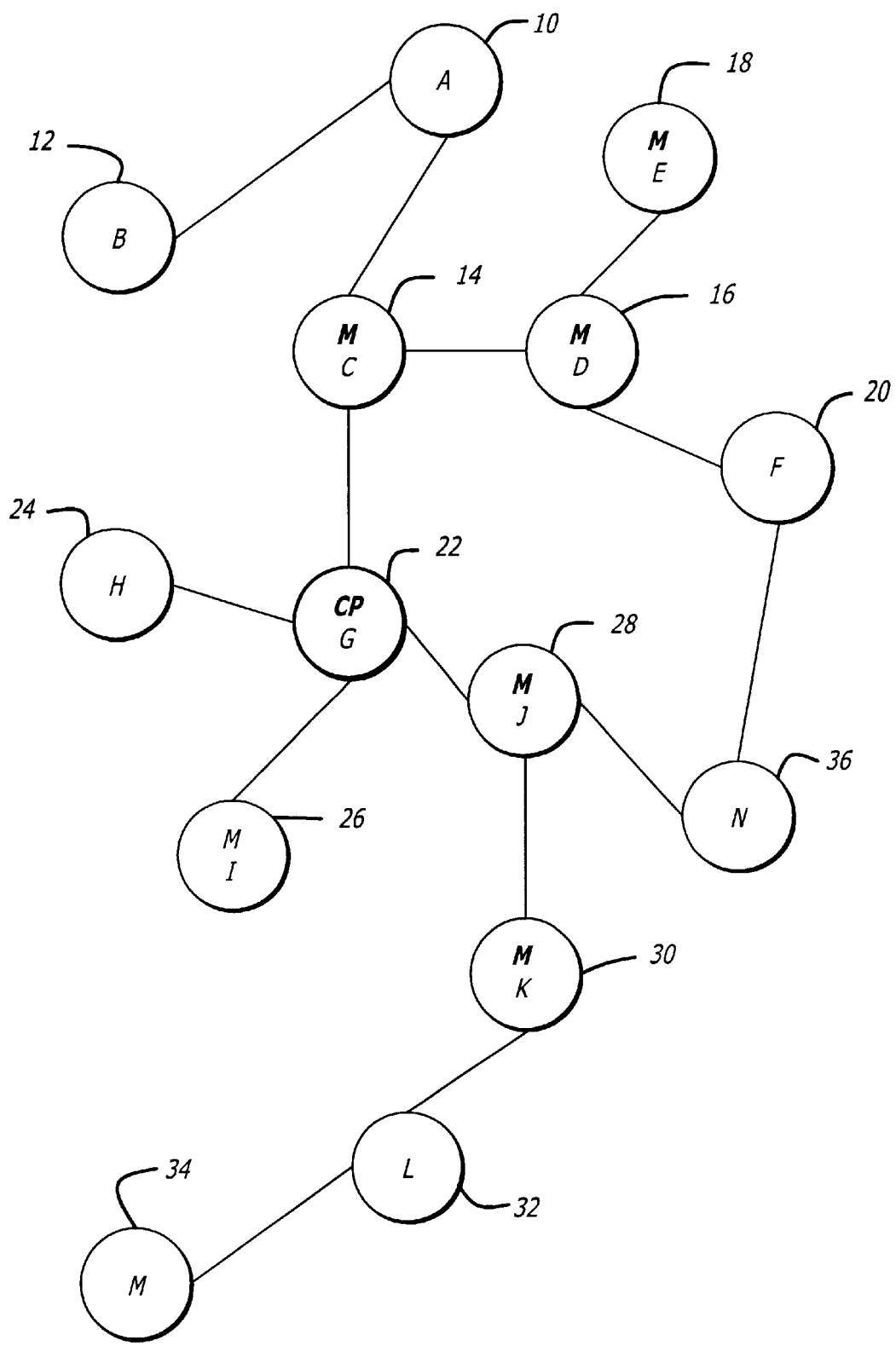
FIG. 1 illustrates an example network having multiple network nodes coupled to one another.

The present invention is related to a system for controlling a multicast session in a network having multiple nodes. FIG. 1 illustrates an example network having multiple network nodes coupled together as shown. The network nodes are identified by reference numerals 10–36, as well as reference characters A–N. Network node 22 (also referred to as node G) has been selected as a control point for a particular multicast session. The members of the multicast session (identified by "M") are nodes 14, 16, 18, 26, 28, and 30. Control point 22 is responsible for controlling the distribution of multicast control information to all nodes participating in the multicast session. Any node coupled to the network and having adequate resources may be selected as a control point. Although the multicast data may not flow through control point 22, the control point is responsible for providing instructions to other network nodes regarding the handling of multicast data.

Furthermore, control point 22 may monitor and measure the multicast data flow throughout the network. This measured data flow is used to determine and update multicast control information. The actual traffic measurements may be performed by various nodes in the network and reported to control point 22 periodically. Additional details regarding the operation of control point 22 are provided below.

The network illustrated in FIG. 1 represents one example of a network with which the present invention may be utilized. Those skilled in the art will appreciate that various other networks of varying topology and size are also capable of implementing the teachings of the present invention. Throughout this description of the invention, the term "network" is used to indicate an entire network, a network area, or a network region. For example, the network illustrated in FIG. 1 may represent an entire network or an area of a larger network environment. A network area or network region may be determined based on a geographic area, departments within a company, a particular number of nodes in each area, or similar criteria.

Figure 2:
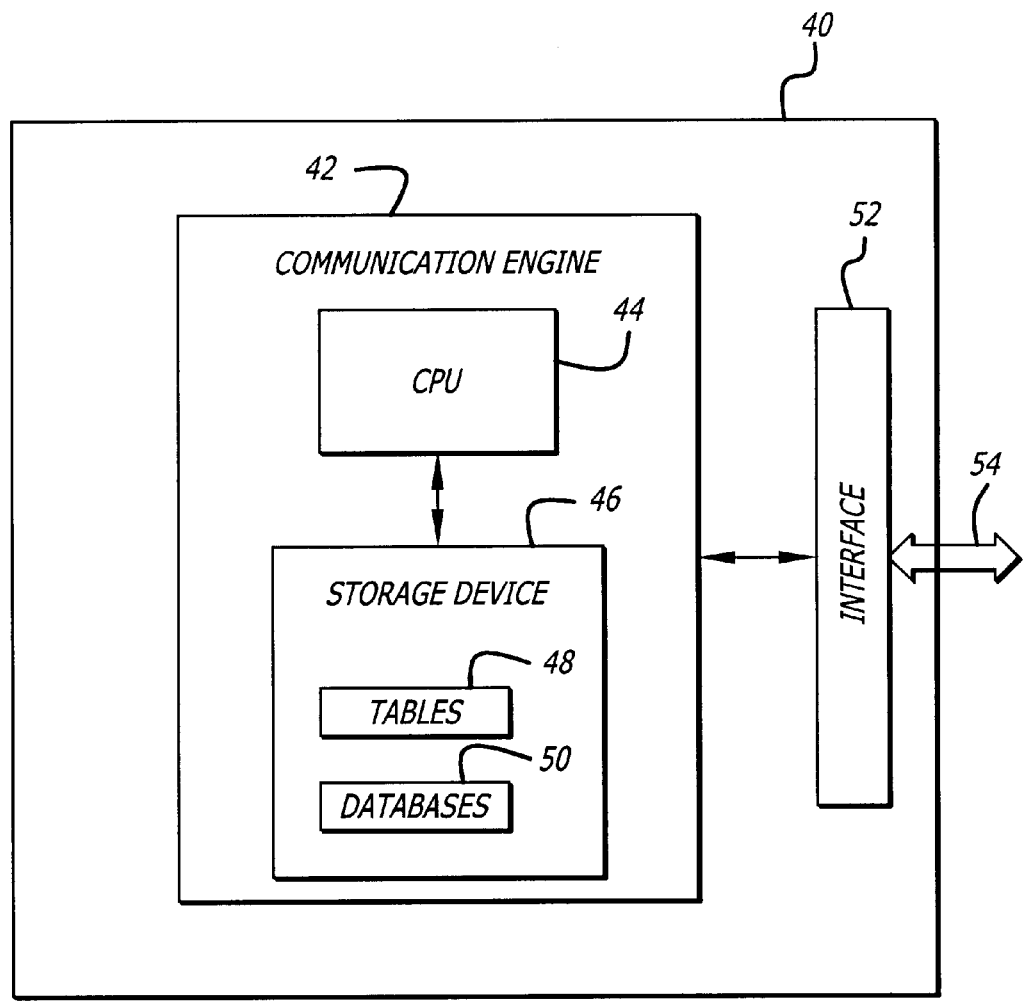
FIG. 2 is a block diagram of an embodiment of a communications device capable of implementing the teachings of the present invention.

FIG. 2 illustrates a block diagram of a communications device 40 capable of implementing the teachings of the invention. Embodiments of the communications device include a router, an asynchronous transfer mode (ATM) switch, and other network devices. Communications device 40 includes a communication engine 42 having a central processing unit (CPU) 44 and a storage device 46. Various types of CPUs may be used in communications device 40. Storage device 46 may be a memory, disk drive, or other mechanism capable of storing data. Communication engine 42 includes various tables 48 and databases 50 contained within storage device 46. Tables 48 and databases 50 may include information necessary for communications device 40 to properly transmit data and identify paths in a network. Databases 50 may include a Link State Database and a Forwarding Database. Communication engine 42 is capable of calculating paths through a network based on information contained in tables 48 and databases 50. CPU 44 is capable of selecting control points and generating multicast control information. An interface 52 is coupled to communication engine 42 and provides a physical connection to one or more network links 54. A single interface 52 and a single network link 54 are illustrated for clarity. However, a particular communications device may have multiple interfaces 52 coupled to multiple network links 54. In an embodiment of the invention, communication engine 42 is capable of performing the functions necessary to control a multicast session. Thus, communications device 40 may function as a control point for a multicast session. Those of ordinary skill in the art will appreciate that other types of communications devices may be used to implement the teachings of the invention.

Figure 3:
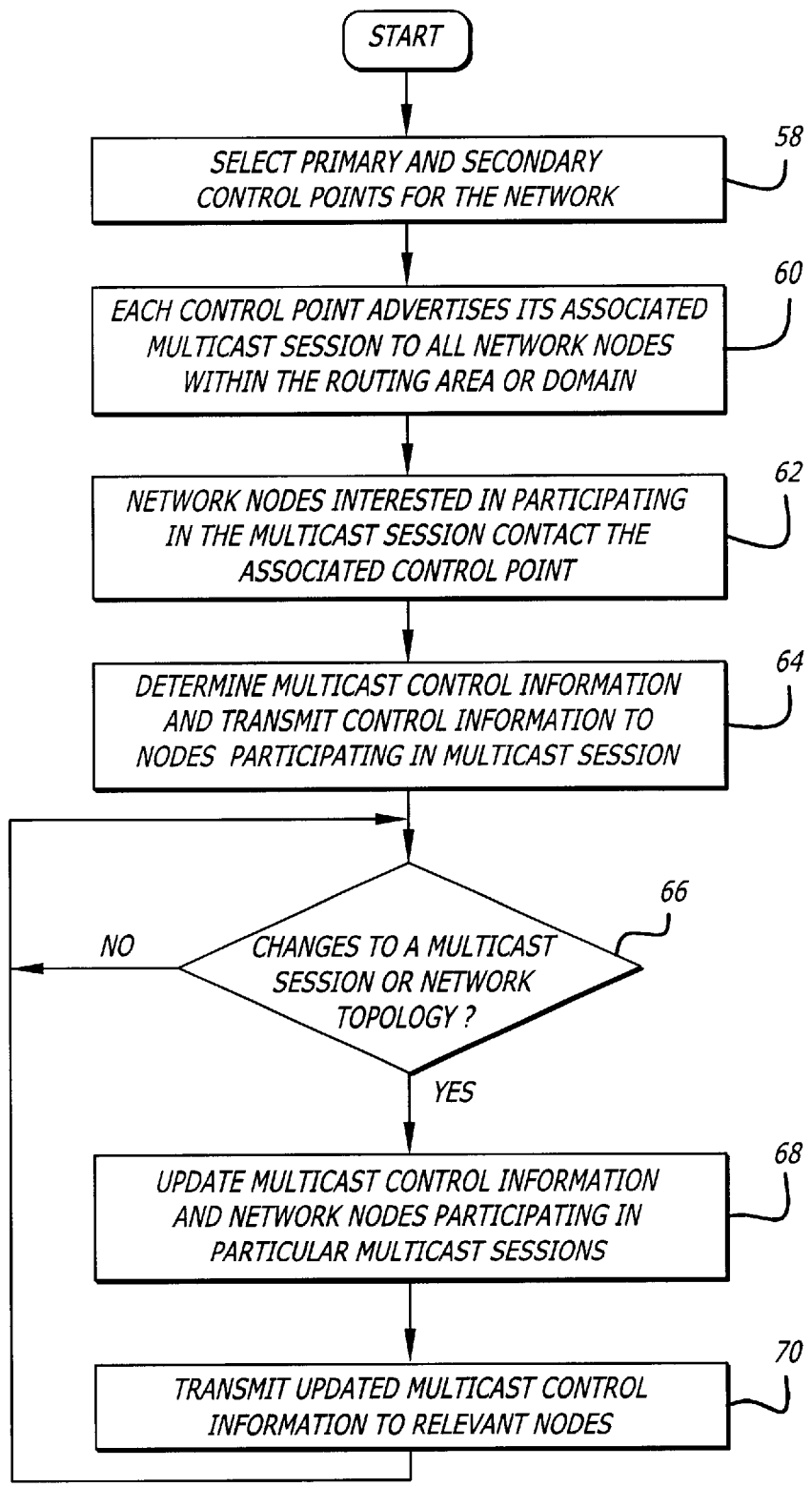
FIG. 3 is a flow diagram illustrating an embodiment of a procedure for controlling a multicast session in a network.

Referring to FIG. 3, a flow diagram illustrates an embodiment of a procedure for controlling a multicast session in a network. Block 58 selects a primary control point (CP) and secondary control point for a particular multicast session. Alternatively, a particular network node may function as a control point for a range of multicast sessions (or multicast addresses). Although a secondary control point is selected in block 58, alternate embodiments of the invention may utilize a single control point without selecting a secondary control point. As discussed below, the secondary control point provides a backup control mechanism if the primary control point fails. The selection of the primary and secondary control points may be performed by the network administrator based on network topology, anticipated or known traffic flow through the network, and other factors. Alternatively, various nodes in the network may be identified as potential control points, and these nodes arbitrate among themselves as to which node will function as the control point for a particular multicast session. This arbitration among the nodes to select a control point may be based on the address of the node, available resources of the node, and similar information.

When selecting a control point or potential control point for a multicast session, it may be preferable to select a node centrally located within the network or network area. As shown in FIG. 1, node 22 is selected as the control point for the multicast session. This particular example has a single control point rather than a primary and secondary control point. As shown in FIG. 1, node 22 is centrally located within the network, thereby providing easier distribution of information to other nodes in the example network.

At block 60 of FIG. 3, each control point advertises information regarding its associated multicast session (or sessions) to all network nodes in the routing area or domain. Advertisements are generated by the control point node as well as any secondary control point nodes. The information is advertised to all network nodes in the area regardless of whether the node is a member of the multicast session. It is necessary to advertise the control point identity to all network nodes to allow the nodes to contact the control point if the node later decides to join the multicast session or receives multicast data destined for the multicast session.

At block 62, network nodes interested in participating in a particular multicast session contact the control point for that session requesting to join the session. Some network nodes participating in a particular multicast session may be preconfigured by the network administrator. The requesting node may provide information for use by the control point in constructing or modifying a multicast distribution tree for the associated multicast session.

Block 64 of FIG. 3 determines multicast control information and transmits the control information to the nodes participating in the multicast session. The information transmitted to the nodes participating in the multicast session includes a list of all members of the multicast group, the type of multicast distribution being used, and data reflection points in the network. Multicast control information may also include specific information regarding existing point-to-multipoint connections in use for the multicast session or other Layer 2 facilities. The type of multicast distribution used may include a shared tree, a source tree or a broadcast-and-prune system. Data reflection points identify the roots of shared distribution trees or nodes capable of acting as the root of a shared distribution tree.

Block 66 of FIG. 3 determines whether any changes to a multicast session have occurred. Additionally, block 66 determines whether any changes to the network topology have been identified. If no changes are identified in block 66, then the procedure returns to block 66 to continuously test for changes. Block 66 may detect various types of changes, including adding new multicast members, deleting existing multicast members, network node failures, or network link failures. If a change is identified at block 66, the procedure branches to block 68 where the multicast control information and network nodes participating in the multicast sessions are updated. This updating may include modifications to reflection points, distribution trees, group members, existing network connections, or existing facilities.

At block 70, the updated multicast control information is transmitted to the nodes participating in the multicast session. The routine then returns to step 66 to test for additional changes.

Referring to the example network of FIG. 1, the procedure illustrated in FIG. 3 initially selects a control point for the multicast session. In FIG. 1, a single control point is selected as node 22. Control point 22 then advertises its existence as the control point to all other nodes in the network (i.e., nodes 10–20 and 24–36), regardless of whether the node is a member of any multicast session. This advertisement includes the multicast groups associated with control point 22. Control point 22 knows the groups it is associated with before generating the advertisement. The particular multicast sessions associated with a control point may be identified by the network administrator or may be determined using an arbitration scheme as discussed above. For this example, a single multicast session is associated with control point 22. Control point 22 then identifies all network nodes associated with the particular multicast session. In the example of FIG. 1, six nodes are identified as participating in the multicast session associated with control point 22 (nodes 14, 16, 18, 26, 28 and 30).

Control point 22 then determines the multicast control information and transmits that control information to all nodes participating in the multicast session (nodes 14–18 and 26–30). Network nodes not participating in the multicast session do not receive any control information from control point 22 regarding the session.

After the nodes participating in the multicast session have received the multicast control information, control point 22 monitors the network for any changes to the multicast session or changes in the network topology. If control point 22 identifies any changes, the multicast session and network nodes participating in the session are updated as needed.

Figure 4:
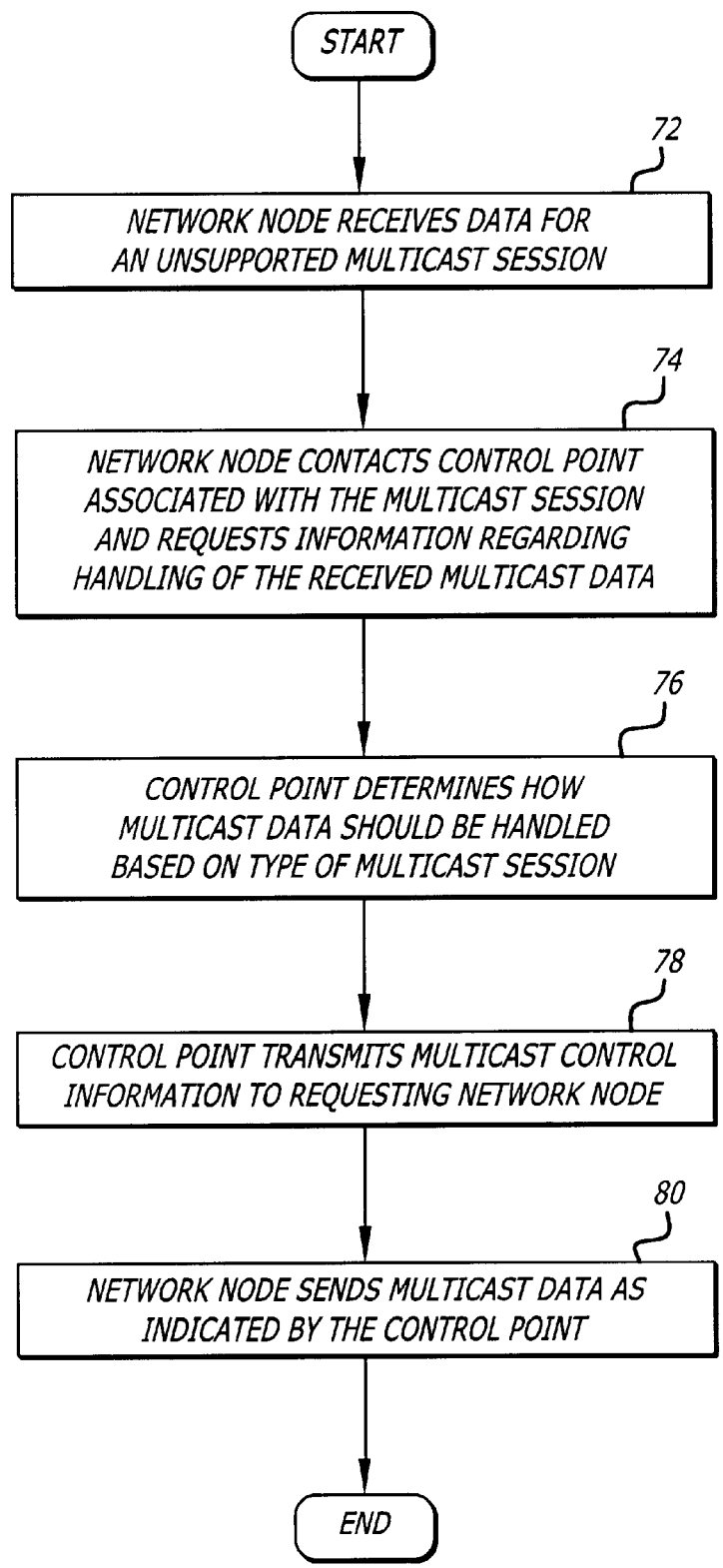
FIG. 4 is a flow diagram showing an embodiment of a procedure utilized when a network node receives data for an unsupported multicast session.

Referring to FIG. 4, a flow diagram illustrates an embodiment of a procedure utilized when a network node receives data for an unsupported multicast session. At block 72, a network node receives data for a multicast session of which the network node is not currently a participating member. Thus, the network node has not received multicast control information from the control point associated with the multicast session. But, the network node has received an advertisement regarding the control point for that multicast session. Therefore, at block 74, the network node contacts the control point associated with the multicast session. Also in block 74, the network node requests information from the control point regarding proper handling of the received multicast data. At block 76, the control point determines how the multicast data should be handled by the requesting node based on the type of multicast session being implemented. At block 78, the control point transmits the appropriate multicast control information to the requesting network node. At block 80, the network node sends the received multicast data based on the multicast control information received from the control point.

Referring to the example network in FIG. 1, network node 10 was not initially established as a member of the multicast session associated with control point 22. However, if node 10 receives data for the multicast session associated with control point 22, node 10 will contact control point 22 and request instructions for handling the multicast data. Control point 22 then considers the type of multicast session being used, and determines the best method for handling multicast data received by node 10. Control point 22 then transmits the multicast control information to node 10. Node 10 sends the received multicast data according to the instructions provided by control point 22.

Figure 5:
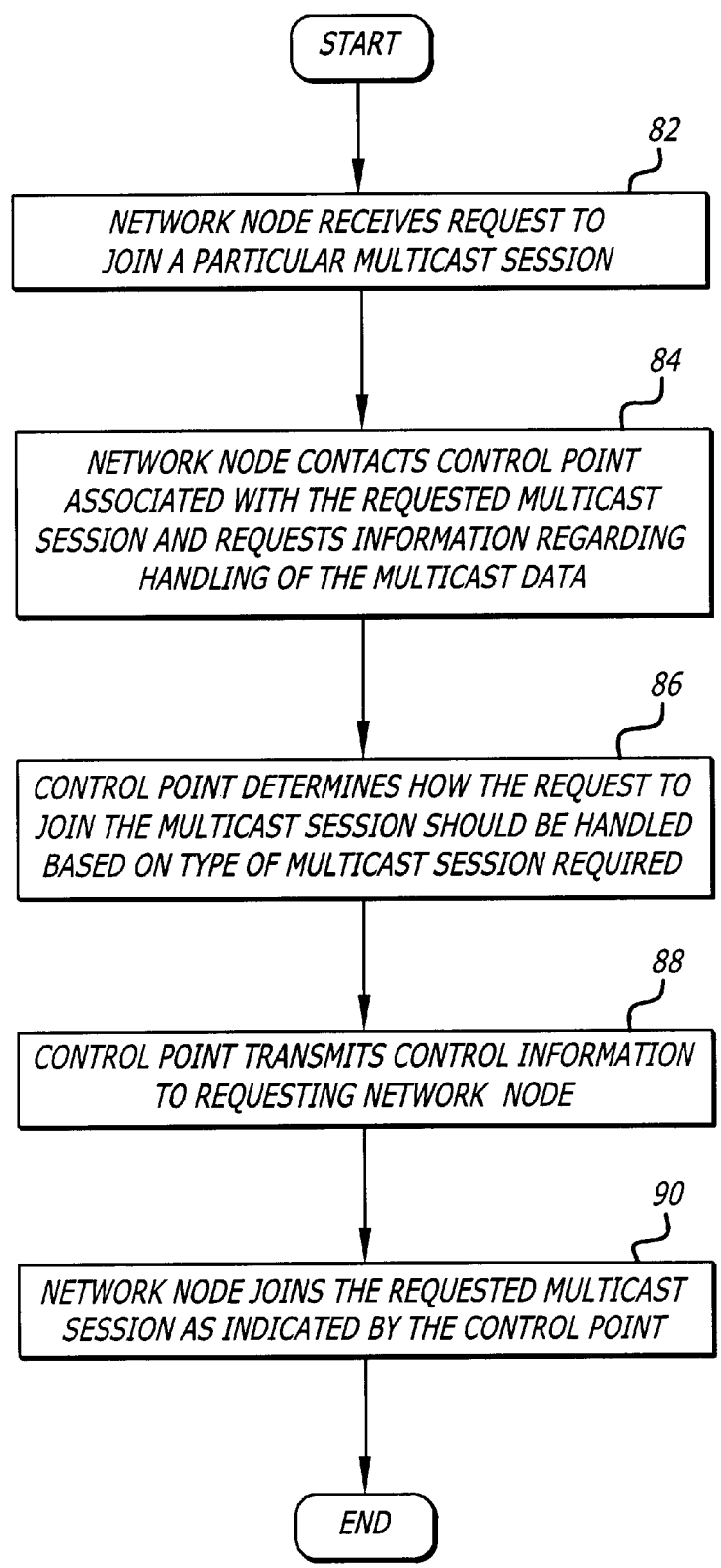
FIG. 5 is a flow diagram illustrating an embodiment of a procedure used when a network node requests to join a multicast session.

Referring to FIG. 5, a flow diagram illustrates an embodiment of a procedure used when a network node requests to join a multicast session. At block 82, a particular network node receives a request to join a particular multicast session. This request may be generated by an end system based on a request from the user. This request to join a multicast session may be received from any device coupled to the network node. At block 84, the network node contacts the control point associated with the requested multicast session and requests control information regarding handling of multicast data for the new node. At block 86, the control point determines how the request to join the multicast session should be handled based on the type of multicast session being requested. This determination is similar to the determination performed in FIG. 3 at block 64. At block 88, the control point transmits the control information determined at block 86 to the requesting network node. At block 90, the network node joins the requested multicast session as indicated by the control information received from the control point. The network node becomes an active participant in the multicast session and handles multicast data as instructed by the control point.

Referring to the example network in FIG. 1, node 32 may receive a request to join the multicast session associated with control point 22. In this situation, node 32 contacts control point 22 and requests information regarding joining the multicast session and proper handling of multicast session data. Control point 22 then determines how to add node 32 to the multicast session and how node 32 should handle multicast data. Control point 22 then transmits the appropriate multicast control information to node 32. Node 32 joins the multicast session and handles multicast data based on the information provided by control point 22.

Figure 6:
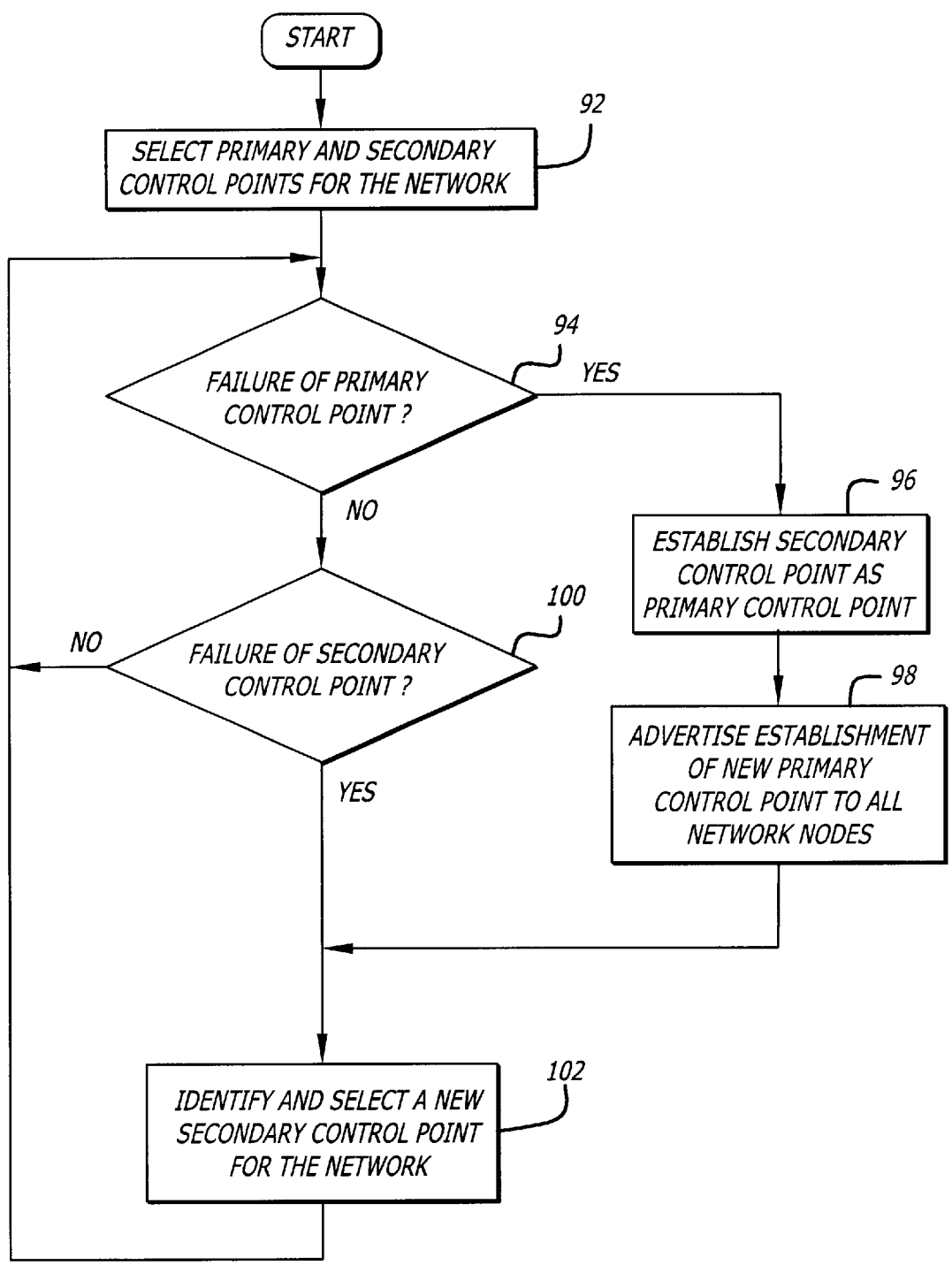
FIG. 6 is a flow diagram showing an embodiment of a procedure for establishing a new control point if an existing control point fails.

Referring to FIG. 6, a flow diagram illustrates an embodiment of a procedure for establishing a new control point if an existing control point fails. At block 92, a primary control point and a secondary control point are selected for the network. The selection of control points is discussed above with reference to FIG. 3. The secondary control point stores a copy of the multicast control information maintained by the primary control point.

At block 94, the procedure determines whether the primary control point has failed. If the primary control point fails, then the procedure branches to block 96 where the secondary control point is established as the primary control point. Since the secondary control point stores a copy of the multicast control information maintained by the primary control point, switching from the primary control point to the secondary control point can be executed quickly with minimal disruption of the multicast session. Furthermore, while the switch-over is occurring, the members of the multicast session can continue handling multicast data according to the control information previously received from the primary control point. Thus, failure of the primary control point does not cause a failure of the entire multicast session.

At block 98 of FIG. 6, the establishment of a new primary control point is advertised to all nodes in the network. This new advertisement is necessary to inform all network nodes not currently participating in the multicast session how to contact the control point, if necessary. After advertising the new primary control point identity, the procedure continues to block 102 where a new secondary control point is identified and selected. This new secondary control point receives and stores a copy of the multicast control information from the new primary control point. The procedure then returns to block 94 to check for additional failures of either the primary control point or the secondary control point.

If the primary control point has not failed at block 94, the procedure branches to block 100 to determine whether a failure has occurred in the secondary control point. If no failure is detected, the procedure returns to block 94 and continues testing for failure of the primary control point or the secondary control point. If a failure of the secondary control point is identified at block 100, the procedure branches to block 102 to identify and select a new secondary control point for the network. The procedure then returns to block 94 to continue testing for a primary or secondary control point failure.

Figure 7A:
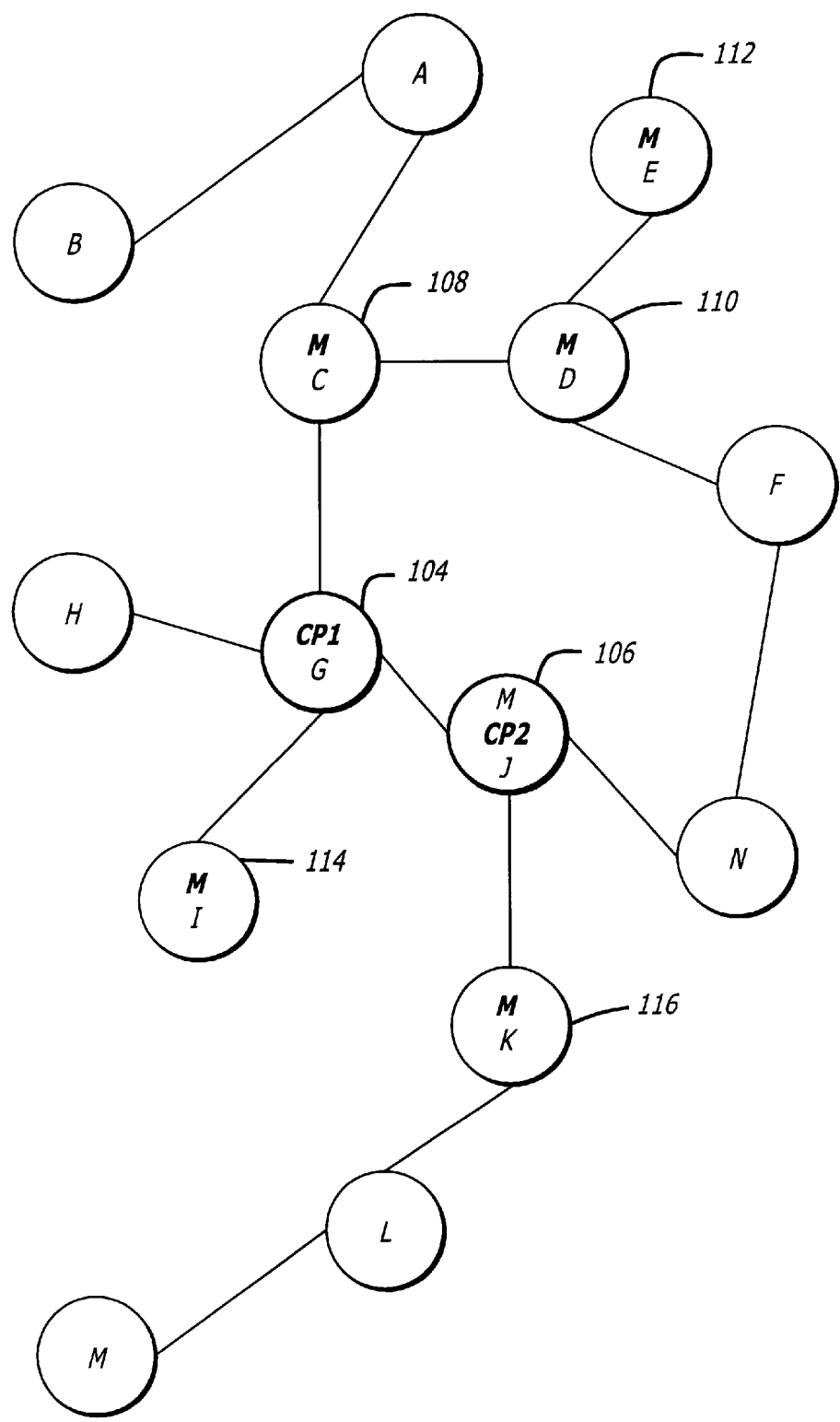
FIGS. 7A and 7B illustrate an example network having primary and secondary control points.

Referring to FIG. 7A, an example network is illustrated having both a primary control point 104 and a secondary control point 106. Primary control point 104 is labeled "CP1" and secondary control point 106 is labeled "CP2." The multicast session supported by primary control point 104 and secondary control point 106 has six members (nodes 106–116, as indicated by "M"). Note that secondary control point 106 is also a member of the multicast session. Thus, node 106 will receive a copy of the multicast control information from primary control point 104 as well as receiving separate multicast data information for controlling the flow of multicast data through node 106.

Figure 7B:
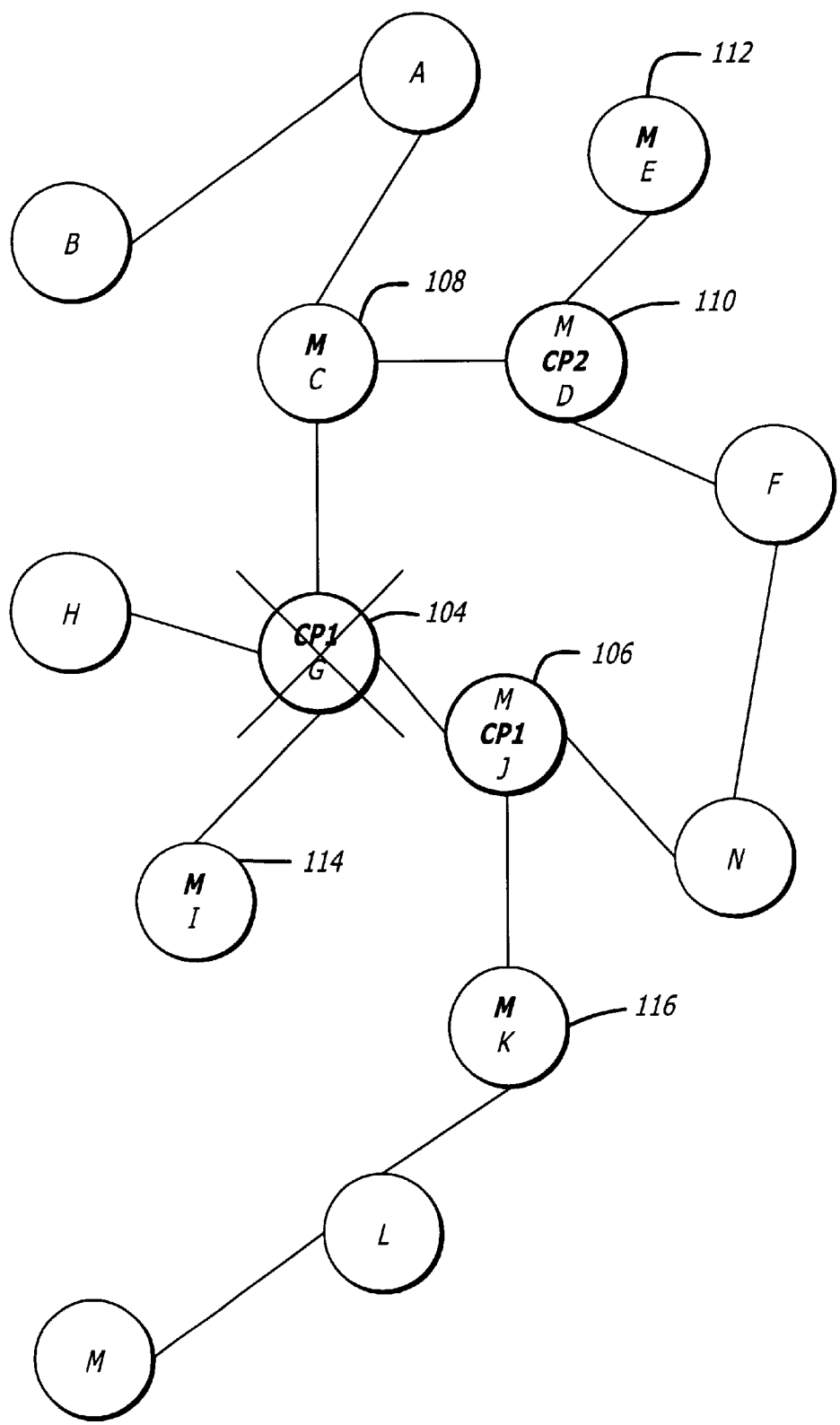

If a failure of primary control point 104 is identified, secondary control point 106 is established as the primary control point for the multicast session and a new secondary control point is established. Referring to FIG. 7B, the network diagram illustrates that former primary control point 104 has failed. In response, former secondary control point 106 is now the primary control point for the multicast session. Additionally, a new secondary control point 110 is established for the multicast session. Secondary control point 110 receives a copy of the multicast control information maintained by primary control point 106.

Since node 104 has failed, node 114 is no longer coupled to the network and, therefore, cannot participate in the multicast session. However, the remaining members (nodes 106, 108, 110, 112, and 116) remain coupled to the network and participate in the multicast session. Control point 106 may update the multicast control information to indicate the lack of connectivity of node 104. This updated multicast control information is transmitted to all multicast members coupled to the network.

If node 104 recovers from its failure, several different events may occur. First, node 104 may become a regular network node, not operating as a control point. Second, node 104 may replace node 110 as the secondary control point for the multicast session. In this situation, node 110 becomes a regular node participating in the multicast session. Third, node 104 may again become the primary control point for the multicast session. In this situation, node 106 may be established as the secondary control point or node 110 maintains its status as the secondary control point. Finally, the network may maintain node 106 as the primary control point and both nodes 104 and 110 as secondary control points. The use of multiple secondary control points provides an additional level of backup.

If a control point fails in a network without a secondary control point, the nodes participating in the multicast session may continue handling multicast data based on previously received multicast control information. The group member nodes may continue handling multicast data until the failed control point recovers or a new control point is established.

The procedures discussed above may be used with any unicast routing protocol capable of advertising the existence of a control point to other nodes in an area or domain, such as Integrated Private Network-to-Network Interface (I-PNNI) or Open Shortest Path First (OSPF). The procedures described may be implemented by various network nodes, including routers, asynchronous transfer mode (ATM) switches, or other network devices.

In alternative embodiments, the present invention may be applicable to implementations of the invention in integrated circuits or chip sets, wireless implementations, switching systems products and transmission systems products. For purposes of this application, the term switching systems products shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access muxes, and associated signaling, and support systems and services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

From the above description and drawings, it will be understood by those skilled in the art that the particular embodiments shown and described are for purposes of illustration only and are not intended to limit the scope of the invention. Those skilled in the art will recognize that the invention may be embodied in other specific forms without departing from its spirit or essential characteristics. References to details of particular embodiments are not intended to limit the scope of the claims.

What is claimed is:

1. A method for controlling a multicast session in a network using a network node operating as a control point, the network having a plurality of nodes, the method comprising:

advertising the control point identity to all nodes in the network including a first network node not participating in the multicast session and at least one network node participating in the multicast session;

determining multicast control information for the multicast session;

identifying the at least one network node participating in the multicast session;

contacting, by the first network node, the selected control point to request information regarding proper handling of multicast data received prior to receiving the multicast control information; and transmitting, by the selected control point, the multicast control information to the first network node.

2. The method of claim 1 further including selecting one of the network nodes as a secondary control point associated with the multicast session.

3. The method of claim 2 wherein the secondary control point maintains a copy of the multicast control information determined by the control point.

4. The method of claim 2 further including transferring control of the multicast session from the control point to the secondary control point if the control point fails.

5. The method of claim 1 further including updating the multicast control information for the multicast session in response to network changes and transmitting the updated information to network nodes participating in the multicast session.

6. The method of claim 1 wherein the multicast control information includes instructions for transmitting multicast data to members of the multicast session.

7. The method of claim 1 wherein the network utilizes a switching system product.

8. The method of claim 1 wherein the network utilizes a transmission system product.

9. The method of claim 1, further comprising:

selecting a network node other than the control point as a distribution point for data messages of the multicast session.

10. The method of claim 1, wherein the multicast session is one of a plurality of multicast sessions, the plurality of multicast sessions including a second multicast session using a different set of network nodes than the first multicast session.

11. A communication device for controlling a multicast session in a network having a plurality of nodes, comprising:

a selection mechanism adapted to select one of the network nodes as a control point associated with the multicast session;

a control mechanism adapted to determine multicast control information for the multicast session, the control mechanism further adapted to transmit the multicast control information to network nodes participating in the multicast session; and an error handling mechanism adapted to contact the control point, identified in a prior advertisement, to request information regarding proper handling of multicast data which the network nodes receive prior to receiving the multicast control information when the network node associated with the communication device is not participating in the multicast session.

12. The communication device of claim 11 wherein the selection mechanism is adapted to select one of the network nodes as a secondary control point associated with the multicast session, the secondary control point to maintain a copy of the multicast control information determined by the control point.

13. The communication device of claim 11 wherein the selection mechanism is a communication engine.

14. The communication device of claim 13 wherein the communication engine includes a central processing unit and a storage device.

15. The communication device of claim 14 wherein the storage device includes a Link State database.

16. The communication device of claim 11 is one of a switching system product and a transmission system product.

17. The communication device of claim 11, wherein the communication device is a router.

18. The communication device of claim 11, wherein the communication device is an asynchronous transfer mode (ATM) switch.

19. The communication device of claim 11, wherein the selection mechanism selects a network node other than the control point for a multicast data distribution point.

20. An apparatus for controlling a multicast session in a network having a plurality of nodes, comprising:

means for selecting one of the network nodes as a control point associated with the multicast session;

means for receiving information advertised by the control point;

means for selecting one of the network nodes as a secondary control point associated with the multicast session;

means for determining multicast control information for the multicast session;

means for transmitting the multicast control information to network nodes participating in the multicast session; and means for contacting, by at least one network node not participating in the multicast session, the control point to request the multicast control information regarding proper handling of multicast data which the at least one network node received prior to receiving the multicast control information.

21. The apparatus of claim 20 further including means for selecting one of the network nodes as a secondary control point associated with the multicast session.

22. The apparatus of claim 20 wherein the secondary control point maintains a copy of the multicast control information determined by the control point.

23. The apparatus of claim 20 wherein control of the multicast session is transferred from the control point to the secondary control point if the control point fails.

24. The apparatus of claim 20, further comprising:

means for selecting a network node other than the control point as a multicast data distribution point for the multicast session.

25. A method for controlling a first multicast session in a network having a plurality of nodes, the method comprising:

selecting one of the network nodes as a control point associated with the first multicast session being one of a plurality of multicast sessions, the plurality of multicast sessions including the first multicast session and a second multicast session having different participating network nodes than the first multicast session;

determining multicast control information for the first multicast session;

transmitting the multicast control information to network nodes participating in the first multicast session;

receiving information that identifies the selected control point;

contacting the selected control point by at least one network node not participating in the first multicast session to request the multicast control information; and sending, by the selected control point, the multicast control information to the at least one node, the multicast control information indicating proper handling of previously received multicast data.

26. A method for controlling a first and second multicast sessions in a network having a plurality of network nodes, the method comprising:

selecting one of the plurality of network nodes as a control point associated with the first and second multicast sessions;

identifying the selected control point to the plurality of network nodes; and determining first and second multicast control information respectively for the first and second multicast sessions, wherein different network nodes of the plurality of network nodes are participating in the first and second multicast sessions;

contacting, by a network node of the plurality of network nodes that is not participating in the first multicast session, the selected control point to request the first multicast control information indicating a proper handling of multicast data received by the network node;

updating the first multicast control information; and sending, by the selected control point, the updated first multicast control information to the network node.

27. The method of claim 26, wherein each of the first and second multicast sessions have a data distribution point other than the control point.

28. The method of claim 26, wherein the selecting of one of the plurality of network nodes as a control point further includes selecting one of the network nodes as a secondary control point associated with the first multicast session, the secondary control point maintains a copy of the first multicast control information.

29. The method of claim 28 further comprising transferring control of the first multicast session from the control point to the secondary control point if the control point fails.

30. The method of claim 26 firther comprising updating the first multicast control information for the first multicast session in response to network changes and transmitting the updated information to network nodes participating in the first multicast session.

31. The method of claim 26, wherein the first multicast control information includes identification of network nodes participating in the first multicast session.

32. The method of claim 26, wherein the first multicast control information includes multicast reflection point locations in the network.

33. The method of claim 26, wherein the first multicast control information includes instructions for transmitting multicast data to members of the first multicast session.

* * * * *